United States Patent Office 2,962,480
Patented Nov. 29, 1960

2,962,480

CHLOROSULFONATION OF DIOLEFIN POLYMERS

Jules Borunsky, Sarnia, Ontario, Canada, assignor to Polymer Corporation Limited, Sarnia, Ontario, Canada, a corporation No Drawing. Filed Oct. 9, 1957, Ser. No. 689,057

12 Claims. (Cl. 260—79.3)

This invention relates to the chlorosulfonation of organic polymers. This application is a continuation-in-part of copending application Serial No. 487,717, filed February 11, 1955, now Patent No. 2,814,609.

The vulcanization of elastomers such as copolymers of butadiene and styrene, butadience and acrylonitrile, isoprene and isobutylene, polybutadiene, polyisoprene and natural rubber is dependent on the chemical reaction that takes place when the polymer is brought into intimate contact with sulfur or a sulfurizing agent, in the presence of heat, in the usual compounding and curing procedures. It has been shown that the presence of chlorine in the molecular structure of such polymers can modify their properties and extend their range of usefulness e.g. chlorinated copolymers of isobutylene and isoprene are known to be useful as tiegums, chlorinated copolymers of butadiene and acrylonitrile form tougher cable sheathing, chlorosulfonated polyisobutylene may be modified to form products suitable as rubber softeners, and chlorine-containing polybutadiene-1,3 may be fabricated into superior gaskets, hoses, impregnated cloths etc. for use where resistance to oil, chemicals and fire is of importance.

Chlorine may be incorporated into the molecular structure of the polymers in a number of ways i.e. polymerization of chlorine-containing monomers, contacting the preformed polymer with chlorine gas, chlorosulfonating the preformed polymer, and the like.

In the past, procedures such as the method described in United States Patent 2,212,786 have been used for chlorosulfonation. In this method the polymer is dissolved in an inert solvent, illuminated by actinic light and reacted with a stream of chlorine and sulfur dioxide gas which is bubbled through the solution. It has been found that varying amounts of chlorine and sulfur could be attached to the polymer by varying the ratios of the gaseous chlorine and sulfur dioxide.

The object of the present invention is to present a method for the chlorosulfonation of preformed polymers.

Another object is to chlorosulfonate preformed polymers in the absence of actinic light.

These and other objects may be attained in the process for the chlorosulfonation of preformed organic polymers of $C_4-C_{14}$ conjugated diolefin hydrocarbons and copolymers of $C_4-C_{14}$ conjugated diolefin hydrocarbons with polymerizable monomers containing the terminal olefinic linkage $CH_2=CH-$ which comprises reacting said polymer with sulfuryl chloride in the presence of a catalytic amount of pyridine, by the improvement comprising effecting such reaction in the presence of a reaction promoter selected from the group consisting of alkali metal sulfites and alkali metal pyrosulfites.

The most common alkali metal salts used are those of sodium and potassium, so the usual salts used are sodium sulfite, potassium sulfite, sodium pyrosulfite and potassium pyrosulfite. The usual catalyst will be pyridine though other sulfonating catalysts may be used.

In practice, the polymer will generally be dissolved or suspended in a non-reactive solvent such as carbon tetrachloride, hexachloroethane or carbon disulfide in a suitable reaction vessel preferably one fitted with an agitator, a reflux condenser to prevent the escape of solvent, a thermometer and means to admit the sulfuryl chloride. After the temperature is raised to the desired point by means of a suitable heater, the solution is stirred rapidly while the alkali metal salt is added either as a powder or as a suspension or solution in the non-reactive solvent. The sulfuryl chloride is then added along with the catalyst. In the case of polyisobutylene, only half the required amount of sulfuryl chloride is added initially since the reaction begins, after an induction period of up to three hours, with a very vigorous evolution of chlorine and sulfur dioxide gases. The rest of the sulfuryl chloride is added after the first surge of gas evolution has subsided. Illumination of the reacting system by actinic light is not necessary but its use will increase the reaction rate somewhat. The solution is agitated vigorously throughout the duration of the reaction in order to blend more thoroughly the alkali metal salt and the sulfuryl chloride during the induction period and, after the reaction has started, to provide a more uniform and intimate contact between the sulfur dioxide and chlorine gases and the dispersed polymer. The agitation also serves to ensure a more rapid neutralization by the salts, of the acids formed during the chlorosulfonation reaction in order to prevent degradation of the polymer. In addition, the agitation provides a more uniform distribution of heat and better heat transfer, thus resulting in improved temperature control.

The temperature at which the reaction is carried out may be varied from room temperature to as high as the boiling point of the solution or even higher if the reactor is pressurized. The pressure should not be so high as to liquify any of the unreacted sulfur dioxide or chlorine gas evolved from the reacting medium as it is known that degradation of the polymer and uncontrolled reactions of explosive force may be encountered with these liquified gases. A temperature between 40° C. and the boiling point of the sulfuryl chloride i.e. 69.1° C. at atmospheric pressure is satisfactory but a temperature of from 50–60° C. and atmospheric pressure is preferred. At temperatures lower than 50° C. the reaction begins to slow down considerably and more energy is required for agitation of solutions containing higher percentages of solids. At temperatures above the boiling point of sulfuryl chloride, the sulfuryl chloride evaporates too quickly to effectively chlorosulfonate the polymer. In addition, at higher temperatures the polymer tends to be degraded as is evidenced by the tackiness of the product, so that a temperature of 70° C. is the preferred maximum whatever the pressure used.

The concentration of polymer in solution may vary considerably but is limited at the higher levels by the necessity for the solution to be fluid enough at all times to allow efficient agitation while the reaction is taking place.

The reaction may continue for as long as twelve hours and, when it has subsided, the polymer may be recovered by any suitable method such as distillation of the solvent or precipitation of the polymer.

The following examples are given to illustrate the present invention:

EXAMPLE I

*Effect of pyridine in absence of actinic light*

560 gms. of a 6% solution of polyisbutylene in carbon tetrachloride were stirred rapidly while 28 gms. of sodium sulfite followed by 20 mls. of sulfuryl chloride were added thereto. When no reaction had started after three hours, three drops of pyridine were added to the reaction mixture. The reaction then started immediately and continued for three hours before subsiding. The temperature of the reacting mass was kept at 55° C. The product was purified as follows:

The carbon tetrachloride solution was washed ten times with water and was then poured into a large excess of acetone to precipitate the polymer. This precipitated polymer was filtered off and dried. After three such purification cycles the polymer was finally dried and analyzed for chlorine and sulfur.

The final dried polymer was found to contain 2.36% chlorine and 0.76% sulfur. It is known that polyisobutylene containing at least 0.5% sulfur and 1.0% chlorine is satisfactory as a cured elastomer.

ride in the ratio of 1:1:2. Without recovery of the polymer and prior to chlorosulfonation, half of the viscous polymerization product (sample B) was treated with solid carbon dioxide to destroy the residual alfin catalyst, while in the other half (sample A) the polymer was chlorosulfonated without such a treatment.

The low-temperature butadiene-styrene polymer which contained about 28% by weight of bound styrene, was prepared by aqueous emulsion polymerization at 55° F. using a sugar-free sulfoxylate recipe.

The isobutylene-isoprene (Butyl) copolymer was prepared by solution polymerization at −145° F. in methyl chloride using aluminum chloride as catalyst. The isobutylene-isoprene ratio was about 99/1.

TABLE 1

| Polymer | Sample | Solvent | Concentration of polymer in solution (Wt. percent) | Weight of solution used (grams) | Vol. of pyridine (cc.) | Vol. of $SO_2Cl_2$ (cc.) | Wt. of Salt (grams $Na_2SO_3$) | Actinic light | Reaction time (hours) | Reaction temperature (° C.) | Wt. of S in polymer (percent) | Wt. of Cl in polymer (percent) |
|---|---|---|---|---|---|---|---|---|---|---|---|---|
| Alfin polybutadiene. | A | Hexane | 5.7 | 350 | 5.0 | 20.0 | 30 | no | 8 | 58 | 0.48 | 10.9 |
|  | B |  | 5.7 | 350 | 5.0 | 20.0 | 30 | no | 8 | 58 | 0.83 | 24.2 |
| Butadiene styrene copolymer. | A | Carbon tetrachloride | 8.0 | 600 | 5.0 | 20.0 | 30 | no | 8 | 58 | 0.56 | 17.1 |
|  | B |  | 8.0 | 600 | 5.0 | 20.0 | 30 | no | 8 | 58 | 0.36 | 17.3 |
| Isobutylene isoprene copolymer. | A | Carbon tetrachloride | 8.0 | 600 | 5.0 | 20.0 | 30 | no | 8 | 58 | 0.08 | 1.7 |
|  | B |  | 8.0 | 600 | 5.0 | 20.0 | 30 | no | 8 | 58 | 0.06 | 1.7 |

EXAMPLE II

*Chlorosulfonation in presence of actinic light*

1170 gms. of a 6% solution of polyisobutylene in carbon tetrachloride were stirred rapidly while 2 mls. pyridine, 90 gms. sodium pyrosulfite and 54 mls. sulfuryl chloride were added. The system was illuminated by ultra violet light while maintaining a temperature of 50° C. After an induction period of two hours a vigorous reaction set in with a strong evolution of sulfur dioxide and chlorine gases. The reaction subsided after two hours and the product was purified as described in Example I. The final dried polymer was found to contain 11.1% chlorine and 1.77% sulfur.

EXAMPLE III 560 gms. of a 6% solution of polyisobutylene in carbon tetrachloride were stirred rapidly while 5 mls. pyridine, 13 gms. sodium sulfite and 10 mls. of sulfuryl chloride were added. The temperature was held at 55° C. until the reaction subsided 12 hours later. The chlorosulfonated product was purified as described in Example I, and was found to contain 5.4% chlorine and 0.6% sulfur.

EXAMPLE IV 560 gms. of a 6% solution of polyisobutylene in carbon tetrachloride were stirred rapidly while 5 mls. pyridine, 26 gms. sodium sulfite and 20 mls. sulfuryl chloride were added. The temperature was kept at 55° C. After an induction period of three hours, a 4½ hour reaction took place. The chlorosulfonated product was purified as described in Example I, and found to contain 1.7% sulfur and 10.7% chlorine.

EXAMPLES V, VI AND VII

Samples of (a) Alfin polybutadiene-1,3, (b) low-temperature aqueous emulsion copolymer of butadiene-1,3 and styrene, and (c) isobutylene-isoprene copolymer i.e. (Butyl rubber) were chlorosulfonated following the method described in Example 1. The results are recorded in Table I.

The Alfin polybutadiene-1,3 was prepared by polymerization in n-pentane using as catalyst a composition composed of sodium isopropoxide-allyl sodium-sodium chlo-

EXAMPLE VIII

A sample of poly-2-methyl butadiene-1,3 was prepared by dissolving 100 cc. of isoprene (2-methyl butadiene-1,3) in 900 cc. of isooctane and adding to the solution 30 cc. of a 1.0 molar solution in hexane of aluminum tri-isobutyl and 30 cc. of a 1.0 molar solution in hexane of titanium tetrachloride. Polymerization was allowed to proceed for 20 hours at +30° C. At this time, the temperature of the reactor was raised to 58° C. and 45 grams of sodium sulfite, 5.0 cc. of pyridine and 200 cc. of hexane containing 27.0 cc. of dissolved sulfuryl chloride were added to the polymer solution over a period of 2.5 hours. The chlorosulfonation reaction was allowed to proceed for 5.5 hours. On recovery and analysis, the polymer was found to contain 0.71 weight percent sulfur and 15.3 weight percent chlorine.

The embodiments of the invention in which an exclusive property or privilege is claimed are defined as follows:

1. In the process for the chlorosulfonation of preformed organic polymers selected from the group consisting of polymers of $C_4$–$C_{14}$ conjugated diolefin hydrocarbons and copolymers of $C_4$–$C_{14}$ conjugated diolefin hydrocarbons with polymerizable monomers containing the terminal olefinic linkage $CH_2=CH-$ which process comprises reacting said polymer with sulfuryl chloride in the presence of a catalytic amount of pyridine, the improvement comprising effecting such reaction in the presence of a reaction promoter selected from the group consisting of alkali metal sulfites and alkali metal pyrosulfites.

2. A process as claimed in claim 1 which includes assisting the reaction with actinic light.

3. A process as claimed in claim 1 in which said salt is sodium sulfite.

4. A process as claimed in claim 1 in which said salt is sodium pyrosulfite.

5. A process as claimed in claim 1 in which said salt is potassium sulfite.

6. A process as claimed in claim 1 in which said salt is potassium pyrosulfite.

7. A process as claimed in claim 1 in which the temperature of the reaction is 40–70° C.

8. A process for the chlorosulfonation of preformed organic polymers selected from the group consisting of polymers of $C_4$–$C_{14}$ conjugated diolefin hydrocarbons and copolymers of $C_4$–$C_{14}$ conjugated diolefin hydrocarbons with polymerizable monomers containing the terminal olefinic linkage $CH_2=CH-$ which process comprises dissolving the polymer in a non-reactive solvent and reacting the polymer solution with sulfuryl chloride at 40–70° C in the presence of a pyridine catalyst and a reaction promoting salt selected from the group consisting of alkali metal sulfites and alkali metal pyrosulfites.

9. A process as claimed in claim 8 in which the polymer is polybutadine-1,3.

10. A process as claimed in claim 8 in which the polymer is poly-2-methylbutadine-1,3.

11. A process as claimed in claim 8 in which the polymer is a copolymer of butadiene-1,3 and styrene.

12. A process as claimed in claim 8 in which the polymer is a copolymer of 2-methylbutadiene-1,3 and isobutylene.

References Cited in the file of this patent

UNITED STATES PATENTS

| | | |
|---|---|---|
| 2,503,252 | Ernsberger | Apr. 11, 1950 |
| 2,586,363 | McAlevy | Feb. 19, 1952 |
| 2,646,422 | Strain | July 21, 1953 |
| 2,814,609 | Borunsky | Nov. 26, 1957 |